US006480112B1

United States Patent
Ball

(10) Patent No.: US 6,480,112 B1
(45) Date of Patent: Nov. 12, 2002

(54) SYSTEM AND METHOD FOR AUTOMATIC SELECTION OF APPROPRIATE CLOTHING WITH REGARD TO TEMPERATURE

(76) Inventor: Katherine Elizabeth Ball, 9223 Westpark Dr., Dallas, TX (US) 75231

(*) Notice: Subject to any disclaimer, the term of this patent is extended or adjusted under 35 U.S.C. 154(b) by 0 days.

(21) Appl. No.: 09/973,977

(22) Filed: Oct. 9, 2001

(51) Int. Cl.[7] .............................................. G08B 17/00
(52) U.S. Cl. .................................. 340/584; 2/1; 223/85
(58) Field of Search ................................ 340/584, 588, 340/589, 586; 223/85, 92; 2/1; 374/141, 161, 162; 116/206, 216

(56) References Cited

U.S. PATENT DOCUMENTS

| | | | | |
|---|---|---|---|---|
| 3,898,884 A | * | 8/1975 | Hopkins | 73/339 C |
| 4,154,105 A | * | 5/1979 | Mackley | 73/346 |
| 5,944,237 A | * | 8/1999 | Gouldson | 223/85 |
| 6,078,262 A | * | 6/2000 | Young | 340/584 |

* cited by examiner

Primary Examiner—Anh La
(74) Attorney, Agent, or Firm—Baker Botts L.L.P.

(57) ABSTRACT

A clothing management system includes a first indicator, several first holders, a second indicator, several second holders, and a sensor. The first indicator is associated with a first temperature range, and the first holders are associated with the first indicator. The second indicator is associated with a second temperature range, and the second holders are associated with the second indicator. The sensor includes a first conductive region, a second conductive region, and a needle. The needle electrically contacts the first conductive region in response to the sensor detecting a temperature within the first temperature range. The needle activates the first indicator in response to electrically contacting the first conductive region. The needle electrically contacts the second conductive region in response to the sensor detecting a temperature within the second temperature range. The needle activates the second indicator in response to electrically contacting the second conductive region.

19 Claims, 3 Drawing Sheets

SYSTEM AND METHOD FOR AUTOMATIC SELECTION OF APPROPRIATE CLOTHING WITH REGARD TO TEMPERATURE

TECHNICAL FIELD OF THE INVENTION

The present invention relates generally to clothing management and, more particularly, to a system and method for automatic selection of appropriate clothing according to temperature.

BACKGROUND OF THE INVENTION

Outside weather conditions often limit the clothing choices available to a person on a particular day. Most notably, different types of clothing may be proper attire for different ranges of temperature. For example, shorts may be appropriate clothing on a hot day, and a coat may be appropriate clothing on a cold day.

If a person chooses clothes that are inappropriate for the outside weather conditions, the person may have to change clothes later in the day. Changing clothes results in a delay which can cause a person to be late for an engagement. In extreme circumstances, an incorrect choice may result in sickness. If a coat is worn on a hot day, a person might suffer from heat exhaustion. If shorts are worn on a cold day, a person might suffer from hypothermia. Existing clothing management systems do not provide efficient and effective methods of selecting clothes according to weather conditions.

SUMMARY OF THE INVENTION

In accordance with the present invention, a clothing management system is provided that substantially eliminates or reduces disadvantages and problems associated with previous systems and methods.

In one embodiment, a clothing management system includes a holder, an indicator, and a sensor. The holder stores clothes, and the indicator is associated with the holder. The sensor detects a temperature, determines whether the temperature is within a temperature range, and activates the indicator in response to determining that the temperature is within the temperature range.

In another embodiment, the clothing management system includes a first indicator, several first holders, a second indicator, several second holders, and a sensor. The first indicator is associated with a first temperature range, and the first holders are associated with the first indicator. The second indicator is associated with a second temperature range, and the second holders are associated with the second indicator. The sensor includes a first conductive region, a second conductive region, and a needle. The needle electrically contacts the first conductive region in response to the sensor detecting a temperature within the first temperature range. The needle activates the first indicator in response to electrically contacting the first conductive region. The needle electrically contacts the second conductive region in response to the sensor detecting a temperature within the second temperature range. The needle activates the second indicator in response to electrically contacting the second conductive region.

Technical advantages of the present invention include a clothing management system that automatically selects clothing according to temperature. By improving a person's ability to choose appropriate clothing for the outside weather, the system reduces delays caused by the need to change clothes. The system also lessens discomfort and the possibility of sicknesses caused by incorrect choices of clothing. The system is particularly useful for aiding those that find decisions regarding the selection of appropriate clothing difficult or important, such as children and elderly persons. The following description, figures, and claims further describe the present invention, including its features, functions, and technical advantages.

DETAILED DESCRIPTION OF THE INVENTION

Figure 1:
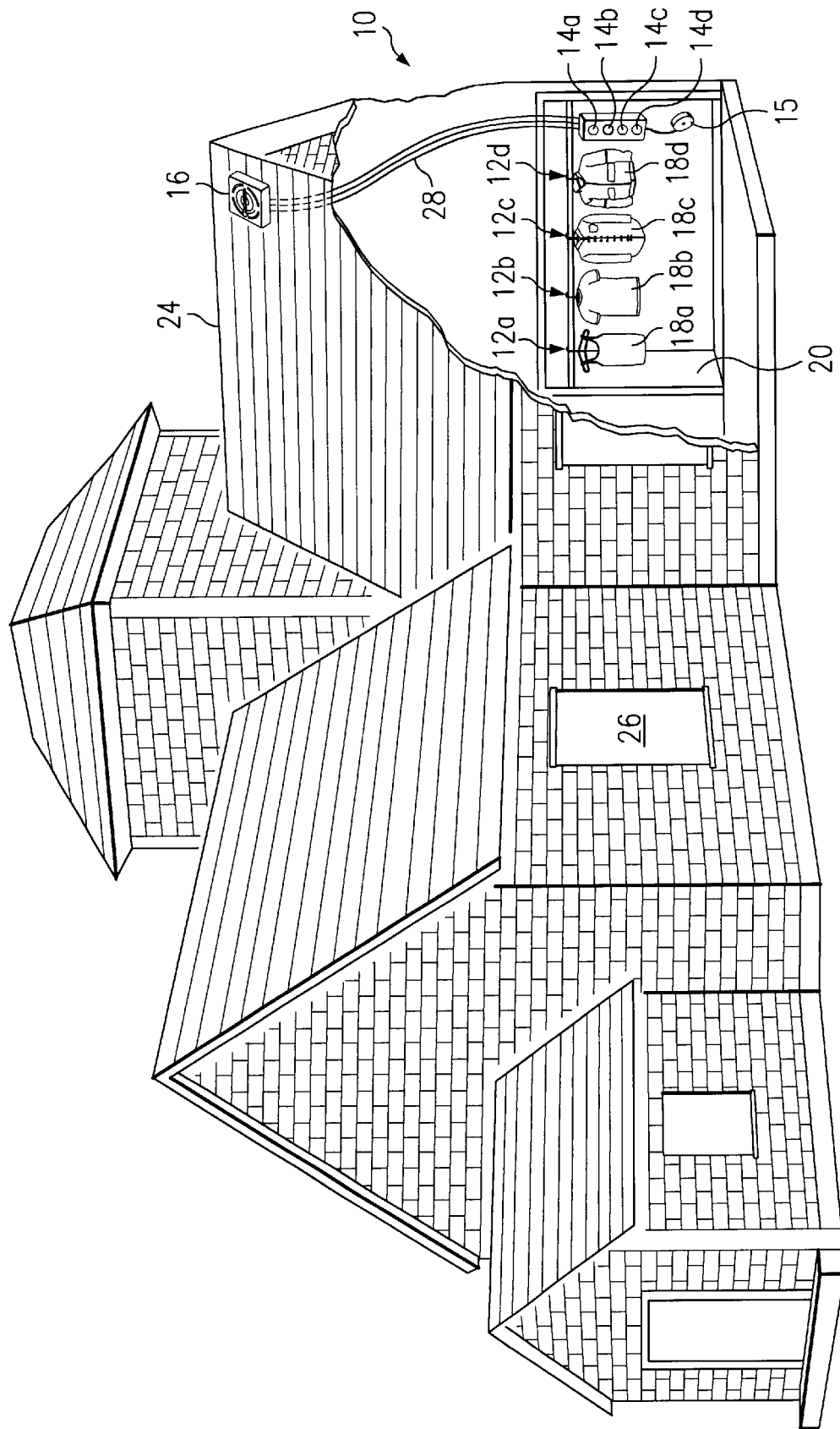
FIG. 1 illustrates a clothing management system in accordance with one embodiment of the present invention.

FIG. 1 illustrates a clothing management system 10 in accordance with one embodiment of the present invention. System 10 includes holders 12a, 12b, 12c, and 12d (collectively, holders 12), indicators 14a, 14b, 14c, and 14d (collectively, indicators 14), and a sensor 16. System 10 selects clothing according to temperature.

Holders 12 store clothes 18a, 18b, 18c, and 18d (collectively, clothes 18) that are appropriate attire for different temperature ranges. In the illustrated embodiment, clothes 18 include a sleeveless shirt 18a, a short-sleeve shirt 18b, a long-sleeve shirt 18c, and a coat 18d. In other embodiments, clothes 18 may include various types of pants, shirts, coats, hats, shoes, gloves, and any other apparel worn as covering or adornment. Holders 12 store clothes 18 in a closet, wardrobe, armoire, or other suitable location. While in the present embodiment holders 12 are hangers, in other embodiments holders 12 might be shelves, drawers, or any other suitable device able to store clothes 18.

Holders 12 can be used to indicate which clothes are appropriate for various temperatures. Holders 12 may have labels, colors, locations, or other attributes that associate holders 12 (and clothes 18 stored on holders 12) with temperatures. In a particular embodiment, holders 12 may be color coded to indicate various temperature ranges or other weather characteristics. For example, holder 12a may be colored red to indicate that sleeveless shirt 18a is appropriate for a temperature range associated with hot weather; holder 12b may be colored yellow to indicate that short-sleeve shirt 18b is appropriate for warm weather; holder 12c may be colored blue to indicate that long-sleeve shirt 18c is appropriate for a temperature range associated with cool weather; and holder 12d may be colored white to indicate that coat 18d is appropriate for a temperature range associated with cold weather. In an alternative embodiment, holders 12 can be labeled to indicate a temperature range or other weather characteristic. For example, holder 12a may be labeled "hot weather," holder 12b may be labeled "warm weather," holder 12c may be labeled "cool weather," and holder 12d may be labeled "cold weather." In an alternative embodiment, the locations of holders 12 may indicate various temperature ranges or other weather conditions. For example, holders 12a on one side of a closet may store clothes 18a for hot weather, and holders 12d on the other side of the closet may store clothes 18d for cold weather.

Indicators 14 are associated with holders 12 and indicate which clothes 18 stored on associated holders 12 are appropriate for the outside temperature. Indicators 14 are associated with holders 12 by a color, label, or other suitable attribute. In a particular embodiment, indicators 14 are lights which are colored to match holders 12. For example, holder 12a and indicator 14a may be colored red; holder 12b and indicator 14b may be colored yellow; holder 12c and indicator 14c may be colored blue; and holder 12d and indicator 14d may be colored white. One of indicators 14 may be activated to indicate which holders 12 store clothes 18 that are appropriate for the outside temperature. For example, if indicator 14a is activated, then holders 12a store clothes 18a that are appropriate for the outside temperature. Although indicators 14 are lights in the illustrated embodiment, indicators 14 may be a digital display, dial, or any other suitable means of identifying associated holders 12.

Sensor 16 detects a temperature and activates one of indicators 14 according to the detected temperature. In a particular embodiment, each indicator 14 is associated with a temperature range, and sensor 16 activates indicator 14 in response to determining that the detected temperature is within its associated temperature range. While sensor 16 is situated on roof 24 in the illustrated embodiment, sensor 16 may be situated on window 26, wall 27 or any other structure from which temperature can be measured. Sensor 16 may use wire line, wireless, or any other suitable type of link 28 to communicate with indicators 14.

Figure 2:
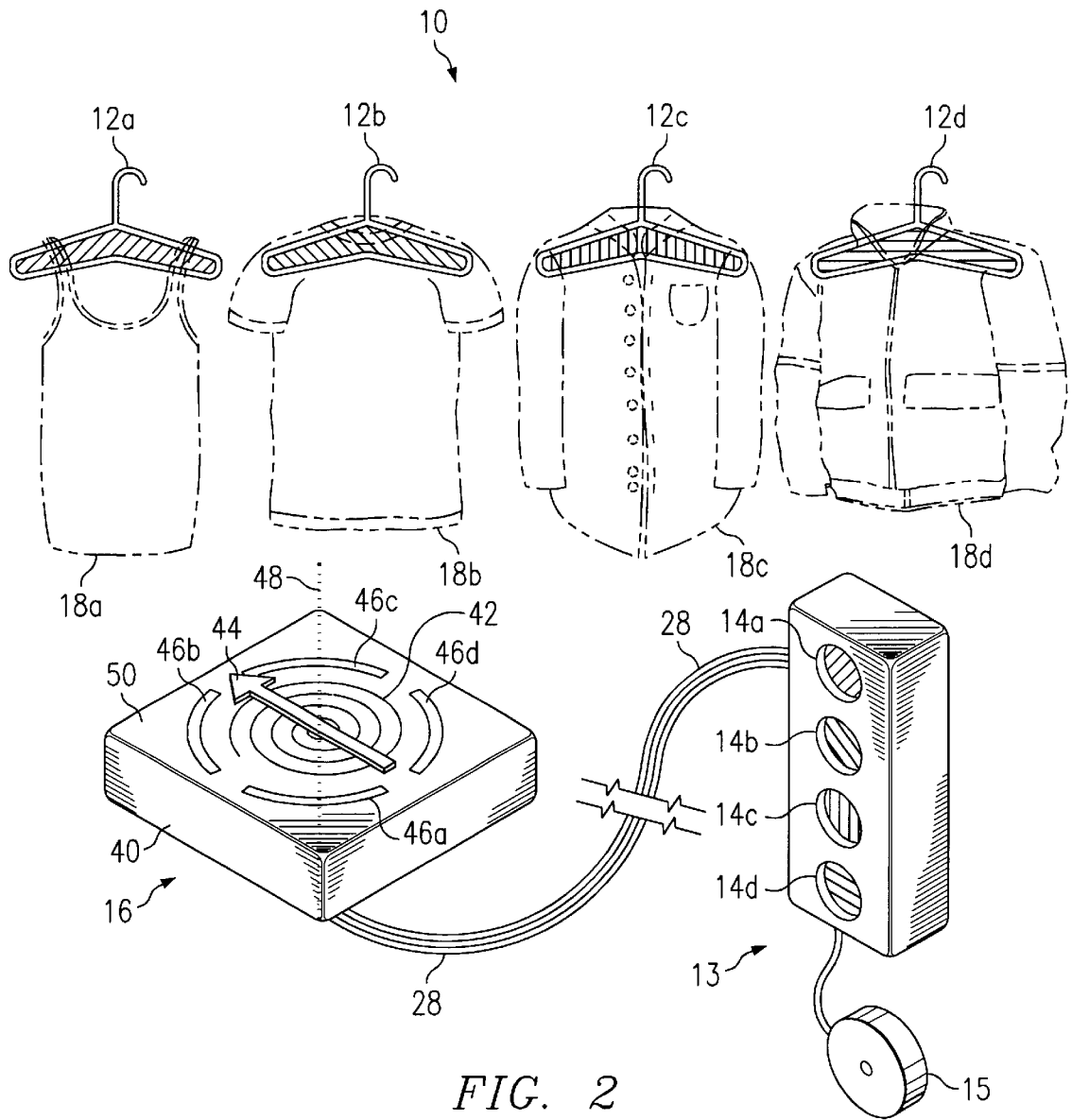
FIG. 2 illustrates holders, indicators, and a sensor of a clothing management system.

FIG. 2 illustrates holders 12, indicators 14, and sensor 16 of clothing management system 10. Holders 12 are hangers which store sleeveless shirt 18a, short-sleeve shirt 18b, long-sleeve shirt 18c, and coat 18d. Indicators 14 are lights which are associated with holders 12 by color (as indicated by the hashing in FIG. 2). Sensor 16 detects a temperature and activates one of indicators 14 according to the temperature.

In the particular embodiment of FIG. 2, sensor 16 operates using a dial mechanism. Sensor 16 includes a body 40, a coil 42, a needle 44, and conductive regions 46a, 46b, 46c, and 46d (collectively, conductive regions 46). Body 40 houses elements of sensor 16 that may be susceptible to the weather or other source of damage. Body 40 may be used to mount sensor 16 to the outside of a house, office building, church or other suitable structure. Coil 42 is a bimetallic strip that expands and contracts in response to changes in temperature. Needle 44 is made of conductive material and is coupled to coil 42. As coil 42 expands and contracts, needle 44 rotates around longitudinal axis 48 according to a change in temperature. As the temperature decreases, needle 44 moves clockwise from conductive region 46a towards conductive region 46d. As the temperature increases, needle 44 moves counter-clockwise from conductive region 46d towards conductive region 46a.

Needle 44 electrically couples to one of conductive regions 46 to activate one of the indicators 14. Each conductive region 46 is associated with one of indicators 14. In the illustrated embodiment, conductive region 46a is associated with indicator 14a; conductive region 46b is associated with indicator 14b; conductive region 46c is associated with indicators 14c; and conductive region 46d is associated with indicator 14d. Coil 42 is calibrated to cause needle 44 to electrically couple to each conductive region 46 when the temperature falls within a specified range. By coupling to one conductive regions 46, needle 44 creates a closed circuit which provides electrical current to indicator 14 associated with conductive region 46. For example, if needle 44 electrically couples to conductive region 46a, electrical current flows to and activates indicator 14a.

Switch 15 turns on or off system 10. In a particular embodiment, switch 15 electrically couples indicators 14 to a power supply to turn-on system 10 and electrically de-couples indicators 14 from the power supply to turn-off system 10. In a particular embodiment, switch 15 may be placed in a doorway so that system 10 turns on when the closet door is open and turns off when the closet door is closed.

Figure 3:
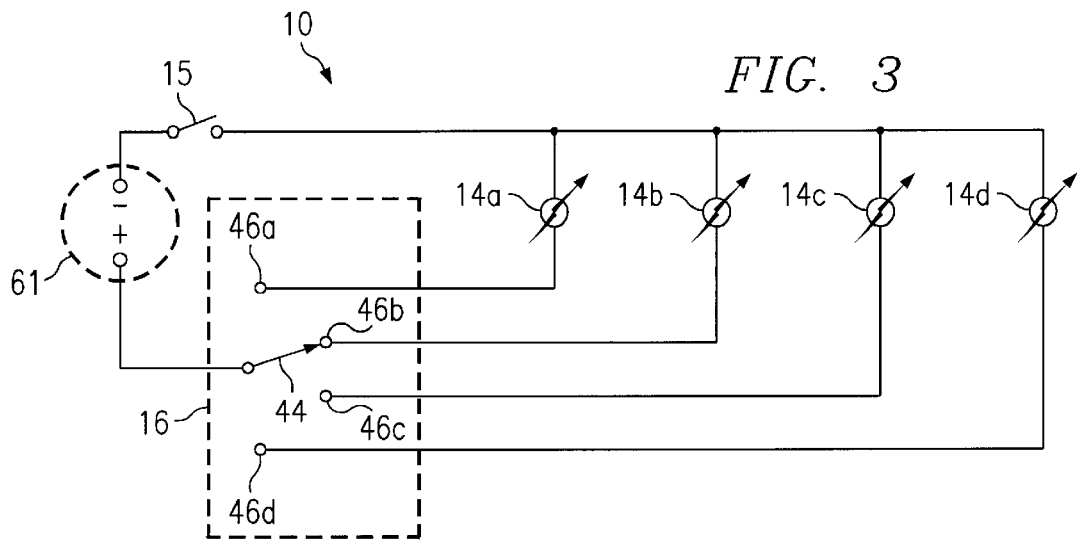
FIG. 3 illustrates the electrical circuitry of a clothing management system.

FIG. 3 illustrates the electrical circuitry of one embodiment of clothing management system 10. A power supply 61 provides power to system 10. Power supply 61 may represent an internal power supply, such as a DC battery, or an external power supply, such as the electricity provided by a utility company. Switch 15 turns on or off system 10 by connecting or disconnecting power supply 61.

When switch 15 is closed to turn-on system 10, sensor 16 activates one of indicators 14. Needle 44 electrically couples to one of conductive regions 46 and forms a closed-circuit between power supply 61 and an associated one of indicators 14. For example, if switch 15 were closed in the illustrated embodiment, sensor 16, by electrically coupling needle 44 to conductive region 46b, would form a closed circuit between power supply 61 and indicator 14b. As a result, sensor 16 would activate indicator 14b, indicating that associated holders 12b store clothes appropriate for the outside temperature. By moving needle 44 to another conductive region 46 in response to a change in temperature, sensor 16 would activate another indicator 14 according to the change in temperature.

Although a particular embodiment of system 10 is described with reference to FIGS. 1, 2, and 3, the present invention encompasses numerous alternative embodiments that select clothing according to temperature. For example, in an alternative embodiment, system 10 may use a digital thermometer with a digital control unit to activate and de-activate indicators 14. In another alternative embodiment, a remote sensor may detect temperature and, by wireless communications, instruct a local control unit to activate a specified indicator 14 according to the detected temperature.

Figure 4:
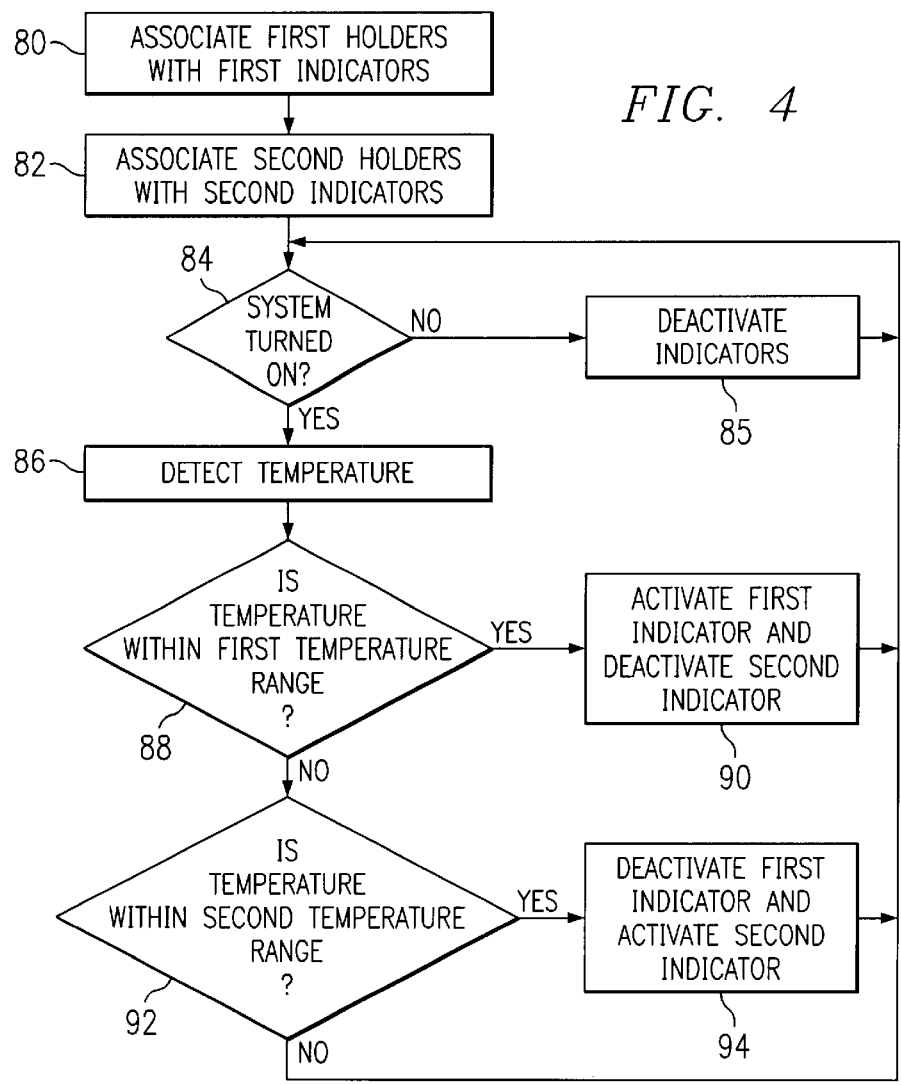
FIG. 4 is a flow chart illustrating a method of managing clothes.

FIG. 4 is a flow chart illustrating a method of managing clothes. The method begins at step 80, where first holders 12a are associated with first indicator 14a. At step 82, second holders 12b are associated with a second indicator 14b. In a particular embodiment, holders 12 are associated with indicators 14 by a common attribute, such as a color. For example, first holders 12a and indicator 14a may both be red, and second holders 12b and second indicator 14b may both be yellow. If system 10 is turned-off at step 84, indicators 14 are deactivated at step 85. If system 10 is turned on at step 84, sensor 16 detects a temperature at step 86. If the temperature is within a first temperature range at step 88, sensor 16 activates first indicator 14a and de-activates second indicator 14b at step 90. If the temperature is within a second temperature range at step 92, sensor 16 de-activates first indicator 14a and activates second indicator 14b in step 94. In a particular embodiment, sensor 16 activates indicators 14 by electrically coupling a needle 44 to one of conductive regions 46 associated with indicators 14, and needle 44 moves in response to changes in temperature. The method continues at step 84, so that system 10 may activate or deactivate indicators 14 in response to system 10 being turned-off or a change in temperature.

Although the present invention has been described in detail, a myriad of changes and modifications may be suggested to one skilled in the art, and it is intended that the present invention encompass such changes and modifications as fall within the scope of the present appended claims.

What is claimed is:

1. A system for managing clothes, comprising:

a holder operable to store clothes;

an indicator associated with the holder; and a sensor operable to detect a temperature, to determine whether the temperature is within a temperature range, and to activate the indicator in response to determining that the temperature is within the temperature range.

2. The system of claim 1, wherein the holder is a hanger.

3. The system of claim 1, wherein the indicator and the holder are associated by a common attribute.

4. The system of claim 3, wherein the common attribute is a color.

5. The system of claim 1, wherein the indicator comprises a light that, when activated, emits a color associated with the holder.

6. A method for managing clothes, comprising:

associating a holder that stores clothes with an indicator;

detecting a temperature;

determining whether the temperature is within a temperature range; and activating the indicator in response to determining that the temperature is within the temperature range.

7. The method of claim 6, wherein the holder is a hanger.

8. The method of claim 6, wherein associating the holder with the indicator further comprises assigning a common attribute to the holder and the indicator.

9. The method of claim 8, wherein the common attribute is a color.

10. The method of claim 6, wherein the indicator comprises a light that, when activated, emits a color associated with the holder.

11. A system for managing clothes, comprising:

a first indicator associated with a first temperature range;

a plurality of first holders associated with the first indicator;

a second indicator associated with a second temperature range;

a plurality of second holders associated with the second indicator; and a sensor comprising:

a first conductive region coupled to the first indicator;

a second conductive region coupled to the second indicator; and a needle operable to electrically contact the first conductive region in response to the sensor detecting a temperature within the first temperature range and to activate the first indicator in response to electrically contacting the first conductive region, the needle further operable to electrically contact the second conductive region in response to the sensor detecting a temperature within the second temperature range and to activate the second indicator in response to electrically contacting the second conductive region.

12. The system of claim 11, wherein the first holders are hangers.

13. The system of claim 11, wherein the first holders and first indicator are associated by a common attribute.

14. The system of claim 13, wherein the common attribute is a color.

15. The system of claim 11, wherein the first indicator comprises a light that when activated emits a color associated with the first holders.

16. The system of claim 11, wherein the first indicator is located in a closet.

17. The system of claim 11, wherein the sensor further comprises a coil coupled to the needle, the coil operable to rotate the needle in response to a change in temperature.

18. The system of claim 11, wherein the sensor is located outside of a building.

19. The system of claim 18, wherein the building is a house.

* * * * *